United States Patent Office 3,093,387
Patented June 11, 1963

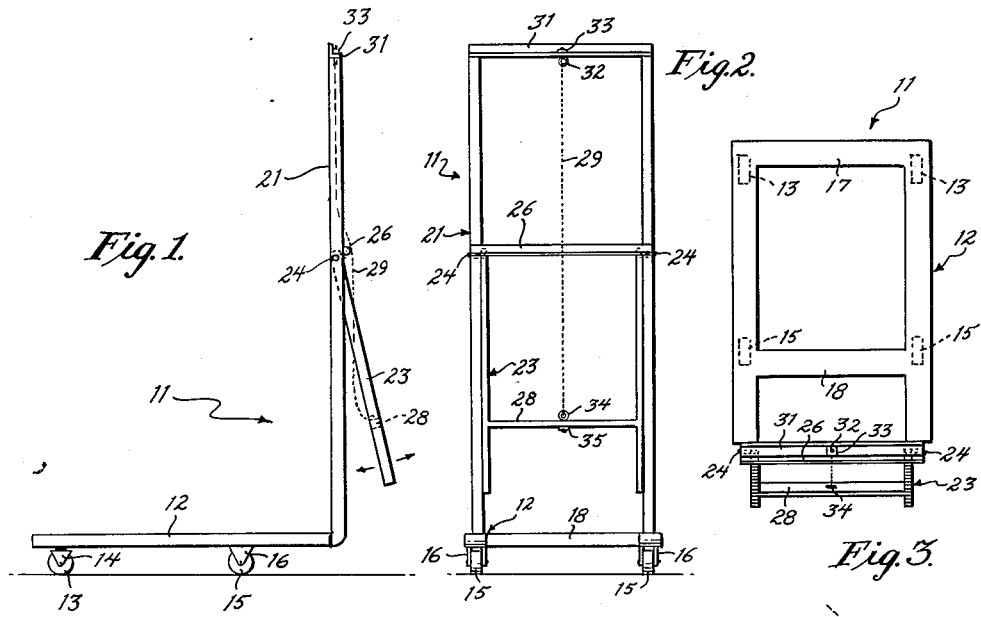
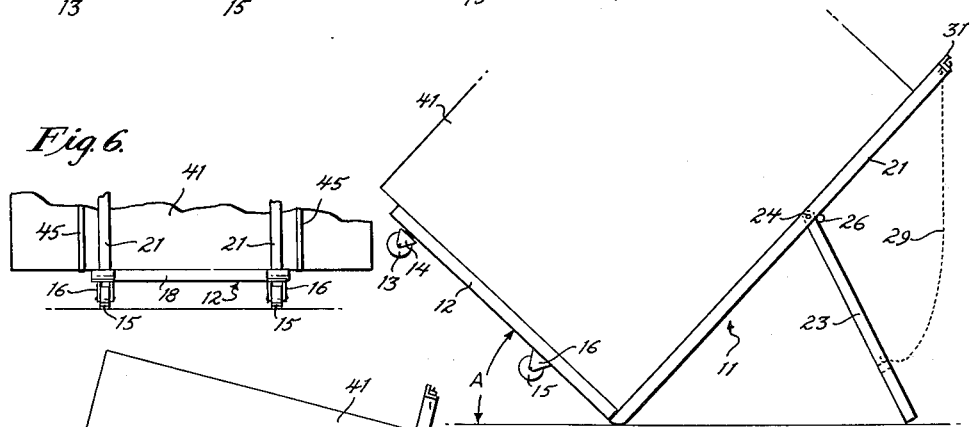
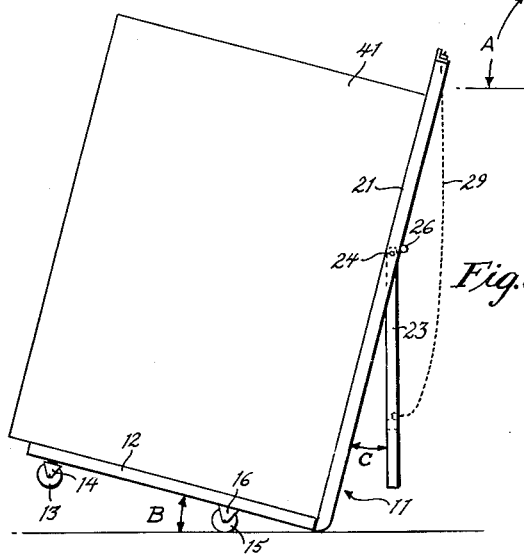

3,093,387
MATERIALS-HANDLING TRUCK
John E. O'Neill, Springfield, Pa., assignor to Nathan Schwartz & Sons, Inc., Philadelphia, Pa., a corporation of Pennsylvania
Filed Feb. 28, 1961, Ser. No. 92,298
4 Claims. (Cl. 280—47.12)

This invention relates to a materials-handling truck, especially such a truck on which cartons are carried.

A primary object of the present invention is provision of a materials-handling truck adapted to be tipped forward to facilitate access to the interior of an open-top carton located thereon.

An object is provision of a materials-handling truck on which cartons can be filled and strapped shut when full.

A particular object is construction of a materials-handling truck having a plurality of tipped rest positions.

A further object is provision of a materials-handling truck having auxiliary support means utilizable either in conjunction with or apart from the wheels of the truck.

Other objects of this invention, together with ways and means of attaining the various objects, will be apparent from the following description and the accompanying diagrams.

FIG. 1 is a side elevation of a materials-handling truck of the present invention;

FIG. 2 is a front elevation of the same truck;

FIG. 3 is a plan of the truck of the preceding views;

FIG. 4 is a side elevation of the same truck carrying a carton and tipped forward off the wheels;

FIG. 5 is a side elevation of the truck and carton of the preceding view tipped to an intermediate position clear of some but not all the wheels; and FIG. 6 is a fragmentary front elevation of the lower portion of both truck and carton.

In general, the objects of the present invention are accomplished, in a materials-handling truck having a wheel-supporting bed, by means of an upstanding frame affixed to the bed near an edge thereof, and a depending member mounted on the frame and adapted to swing to a limited extent outward beyond the edge of the bed when the truck is tipped to lower that edge, the depending member being adapted to constitute a support for the truck when tipped on to that edge. The invention comprehends particularly such a truck having an edge portion of the bed adapted to help support the truck in either of two tipped positions, the truck being adapted to rest in one tipped position on that portion of the bed and a pair of the wheels with the rest of the wheels clear of the floor, and being adapted to rest in another tipped position on that portion of the bed and the depending swingable member in its outwardly swung position.

FIG. 1 shows, in side elevation, truck 11 constructed according to this invention. Flat bed 12 is supported level on pair of rear wheels 13 (only one visible in this view), located near the rear corners of the bed, and pair of front wheels 15 (one visible). The front wheels are not located at the front corners of the bed but, although at opposite side edges as are the rear wheels, are located approximately one third of the way from front to rear of the bed. The rear wheels have swivel mountings 14, while mountings 16 of the front wheels are mounted in a fixed orientation parallel to the side edges of the bed.

FIG. 1 also shows upstanding frame 21 affixed to the front edge of the bed. Swing brace 23 is pivoted on pins 24 (only an end of one being visible) located at a level somewhat more than halfway up the frame. Affixed to the front of the frame just above the level of the pins is stop bar 26. Chain 29, which is partly hidden in this view, extends from the top of the swing brace to cross-piece 28 (also hidden, indicated in broken lines) near the bottom of the brace. Although the swing brace normally (i.e., when the truck bed is level) would hang in line with the upstanding frame, it is shown swung partly outward beyond the front edge of the bed, the arrows indicating the direction of movement of the brace about the pivot pins.

FIG. 2 shows, in front elevation, truck 11 of the preceding view. Upstanding frame 21 appears in inverted U form, while swing brace 23 has an H configuration. Top piece 31 of the frame parallels cross-piece 28 of the swing brace, the side pieces of the brace fit inside the side pieces of the frame and each has an eye-bolt centered therein; eye-bolt 32 is inverted and is held in the frame top piece by nut 33 on top thereof, while eye-bolt 34 passes downward through the brace cross-piece and is retained therein by nut 35. Chain 29 is held at its extremities by the respective eye-bolts; it passes in front of stop bar 26, which bridges the side pieces of the frame. Transverse member 18 of the bed is visible between (actually somewhat to the rear of) the front ends of the respective side members of the bed, all of which appear more fully in the next view.

FIG. 3 shows, in plan, truck 11 with swing brace 23 swung slightly outward beyond the front, as before, in the interest of clarity. Transverse member 18 of the bed bridges the left and right side pieces of the rectangular bed, which is open or skeletonized both ahead of that transverse member and between that member and parallel rear member 17, which joins the respective side members at the rear corners. The pairs of wheels (indicated in broken lines) are located in the vicinity of the opposite ends of the respective transverse members of the bed.

Operation of the materials-handling truck of this invention is readily understood by reference to the succeeding views, which show (in outline only) carton 41 in place on the truck. The illustrated carton is slightly shorter than the upstanding frame at the front of the truck, although taller cartons can be accommodated.

FIG. 4 shows, in side elevation, truck 11 tipped forward on its front edge, which in the illustrated construction is the portion provided by the front ends of the respective side pieces of the bed. Swing brace 23 is swung outward against stop bar 26, and the bottom end of the brace is resting on the floor or other supporting surface, shown as a solid horizontal line. Thus, the truck is balanced, together with the carton, on the swing brace and the front edge of the bed, with all its wheels clear of the floor. It will be apparent that chain 29 provides the operator of the truck with a ready way of swinging the brace to its extreme outward position without necessity for manual contact with the brace itself. When the truck is tipped forward on this position the operator has ready access to the top of the carton and to the interior if the carton is of the usual type with opening flaps at the top. Accordingly, the operator can load or unload the contents of the carton without having to stretch or strain in reaching the bottom. Of course, the truck passes through a range of intermediate positions in tipping to reach the extreme position shown in FIG. 4.

FIG. 5 shows a stable tipped position of truck 11 at an intermediate angle of tip or tilt. Whereas angle A between the bed and the floor in FIG. 4 was on the order of half a right angle, angle B between the bed and the floor in FIG. 5 is only about one third as much, i.e., about one sixth of a right angle.

In FIG. 5 the swing brace no longer is helping support the truck but is hanging vertically, i.e., forming angle C (equal in magnitude to angle B) with the upstanding frame. The truck is supported by contact of its front edge and its front wheels with the floor. This intermediate position is useful at the terminal stage of loading or initial stage of unloading a carton or similar container on the truck, as will be apparent. It also facilitates closing and labeling of the top, as may be desired.

FIG. 6 shows, in front elevation, the lower part of truck 11 and carton 41 resting thereon, both in level position. The carton extends outward over the side edges of the bed, and strapping tapes 45 are shown in place at the left and right. The tapes, which extend completely about the carton, are visible rising from underneath the bottom and parallel to the side pieces of the swing frame located therebetween.

The materials-handling truck of this invention not only provides means for transporting cartons or other containers from one place to another but, as is apparent from the above description and the various views of the truck, provides a convenient means for supporting the same, especially in such tipped position as to provide ready access to the top or to the interior via an open top therein.

No special materials of construction are required for this truck, which may be made of steel, in angle, channel, or tubular shapes or the like, or of other suitably strong metal or other material or combination thereof. The skeletonized structure thereof and other simplifying features of construction favor lightness in weight and simplicity in operation at low cost. Assembly by welding presents no problem. Of course, more elaborate construction might be employed with like effect, and various of the parts may be divided or combined or assembled by bolting or other means without a departure from the inventive concept or sacrifice of the advantages of the invention as claimed herein.

The claimed invention:

1. Materials-handling truck comprising a generally rectangular bed, an upstanding frame affixed to the bed along an edge thereof, bed-supporting wheels mounted on the bed and adapted to support it essentially parallel to the floor, with a pair of the wheels spaced apart along a line parallel to and spaced from that edge of the bed, the wheel diameter and the wheel spacing from that edge of the bed being such that a tangent to the lower portion of each wheel from the edge of the bed defines an angle with respect to the bed amounting to approximately one-sixth of a right angle, the truck being adapted to rest in tipped orientation on that pair of wheels and that edge of the bed, depending swing brace pivoted on the frame and adapted to swing out beyond the edge of the bed, and a stop adapted to limit the angle through which the brace is adapted to swing outward, the truck also being adapted to rest in further tipped orientation on that brace swung outward and that edge of the bed with the wheels clear of the floor.

2. Materials-handling truck comprising an empty, generally rectangular bed, a first pair of bed-supporting wheels located in the vicinity of a pair of adjacent corners of the bed and mounted thereon, a second pair of bed-supporting wheels located intermediate the first pair of corners and the other pair of corners of the bed and mounted thereon, an upstanding frame affixed to the bed in the vicinity of the second pair of corners, a depending swing brace pivoted on the frame and adapted to swing out beyond the edge of the bed intermediate the second pair of corners, and stop means affixed to the frame and adapted to limit the outward swing of the brace, the second pair of corners and the brace in its limited outward position being adapted to support the truck tipped off its bed-supporting wheels into an extreme rest position, and the second pair of wheels being adapted to support the truck tipped to an intermediate rest position onto the second pair of wheels.

3. Materials-handling truck comprising a rigid rectangular bed, a first pair of bed-supporting wheels mounted on the underside of the bed at a pair of opposite corners adjacent a first narrow side edge of the bed, a second pair of wheels mounted on the underside of the bed at opposite long side edges intermediate the first pair of corners and the other pair of corners of the bed, the wheel diameter and distance of the axis of the second pair of wheels from the underside of the bed and from the nearer pair of corners being such that the truck can assume a tipped rest position supported on those wheels and the edge of the bed adjacent those corners, an upstanding frame affixed to the bed along the second narrow side edge thereof, a depending swing brace pivoted at opposite sides of the frame and adapted to swing outward beyond the second narrow edge of the frame and adapted to constitute a support for the truck when tipped onto the second narrow edge of the bed, a stop affixed to the frame and adapted to limit the outward swing of the brace, and a chain extending from the top of the upstanding frame to near the bottom of the swing brace and affixed at its extremities to both.

4. The truck of claim 3 wherein the stop comprises a bar extending from side to side of the swing brace, and the chain extending from the top of the frame to near the bottom of the swing frame and affixed to both passes by the stop on the side thereof outward from the truck interior and is just slack when the swing brace is aligned with the upstanding frame.

References Cited in the file of this patent
UNITED STATES PATENTS

| | | |
|---|---|---|
| 1,436,665 | Monro | Nov. 28, 1922 |
| 2,800,337 | Avril | July 23, 1957 |
| 2,846,233 | Burg | Aug. 5, 1958 |
| 2,981,549 | Hotton | Apr. 25, 1961 |